United States Patent [19]

Nakajima et al.

[11] Patent Number: 5,014,332

[45] Date of Patent: May 7, 1991

[54] IMAGE READER

[75] Inventors: Akio Nakajima; Munehiro Nakatani, both of Osaka, Japan

[73] Assignee: Minolta Camera Kabushiki Kaisha, Osaka, Japan

[21] Appl. No.: 174,820

[22] Filed: Mar. 29, 1988

[30] Foreign Application Priority Data

Mar. 31, 1987 [JP] Japan .................................. 62-78855
Mar. 31, 1987 [JP] Japan .................................. 62-78856

[51] Int. Cl.⁵ .............................................. G06K 9/38
[52] U.S. Cl. ......................................... 382/50; 382/53; 358/446; 358/466
[58] Field of Search ............................ 382/50, 53, 65; 358/446, 461, 464, 466

[56] References Cited

U.S. PATENT DOCUMENTS

| 4,384,272 | 5/1983 | Tanaka et al. | 382/50 |
| 4,408,231 | 10/1983 | Bushaw et al. | 382/50 |
| 4,562,486 | 12/1985 | Suzuki et al. | 382/50 |
| 4,760,609 | 7/1988 | Tamagaki | 382/65 |
| 4,763,200 | 8/1988 | Nakatani et al. | 358/466 |

Primary Examiner—David K. Moore
Assistant Examiner—Jose L. Couso
Attorney, Agent, or Firm—Burns, Doane, Swecker & Mathis

[57] ABSTRACT

An image reader comprises a line image sensor for reading images of an original for every line, a CPU for extracting the density level of the background based on the read image data for comparing the extracted density level with a reference level to find the difference, light adjusting circuit for adjusting the intensity of a lamp for exposing the original so as to make the difference obtained by the operation equal to 0 and a compare circuit for converting the read image data to binary data, wherein the adjustment of the intensity of the lamp by the light adjusting circuit is carried out in parallel to the conversion of the image data by the compare circuit.

10 Claims, 12 Drawing Sheets

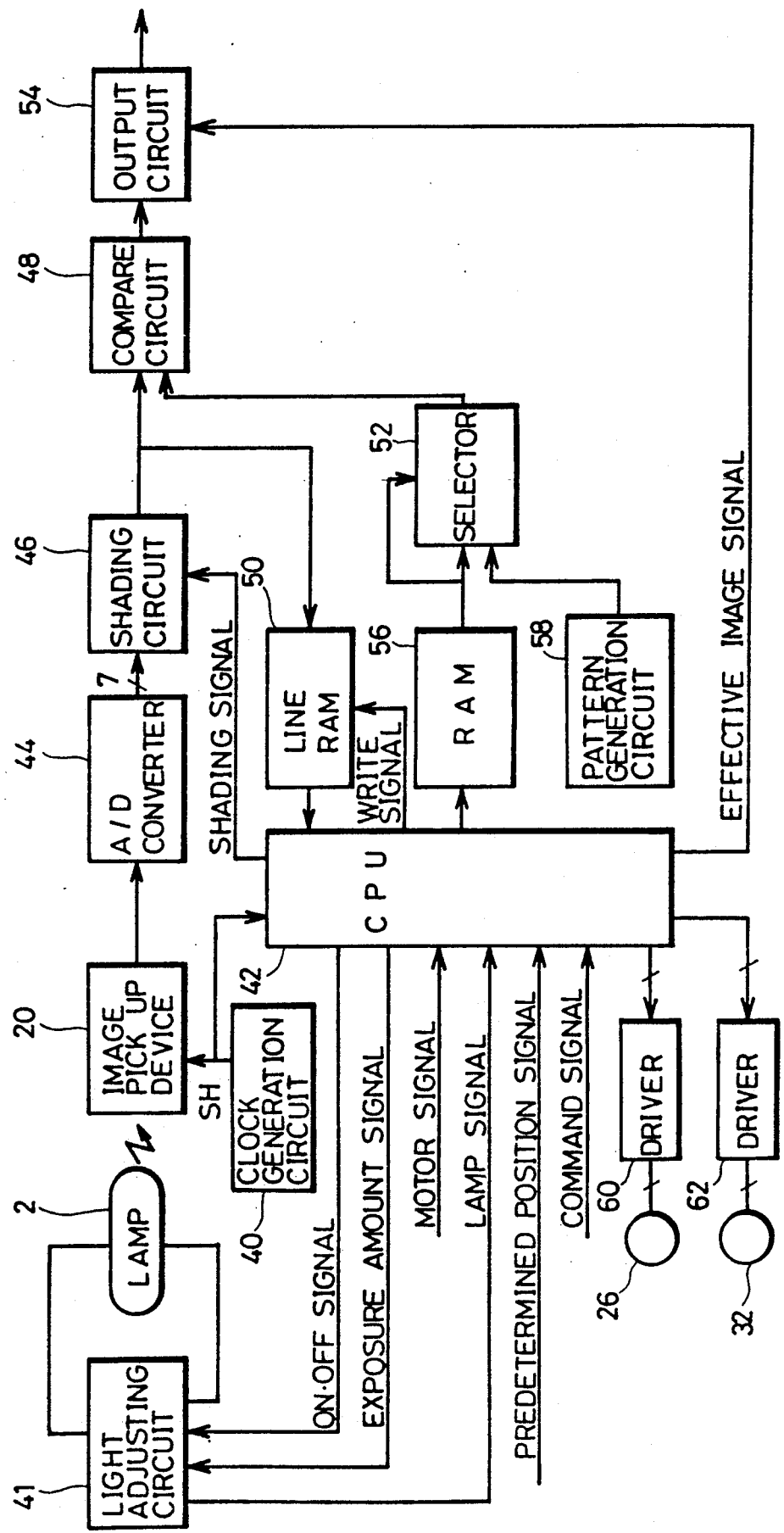

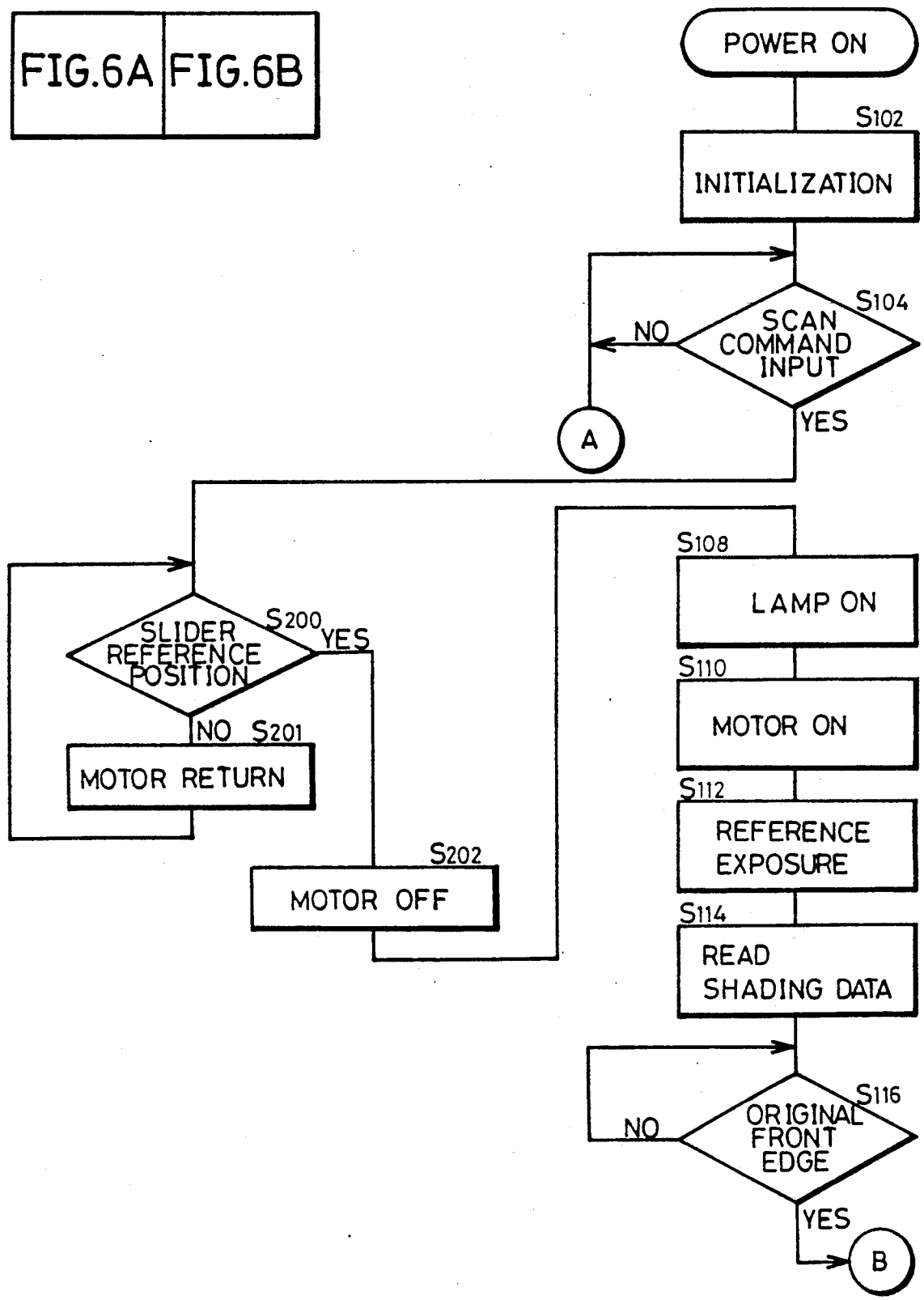

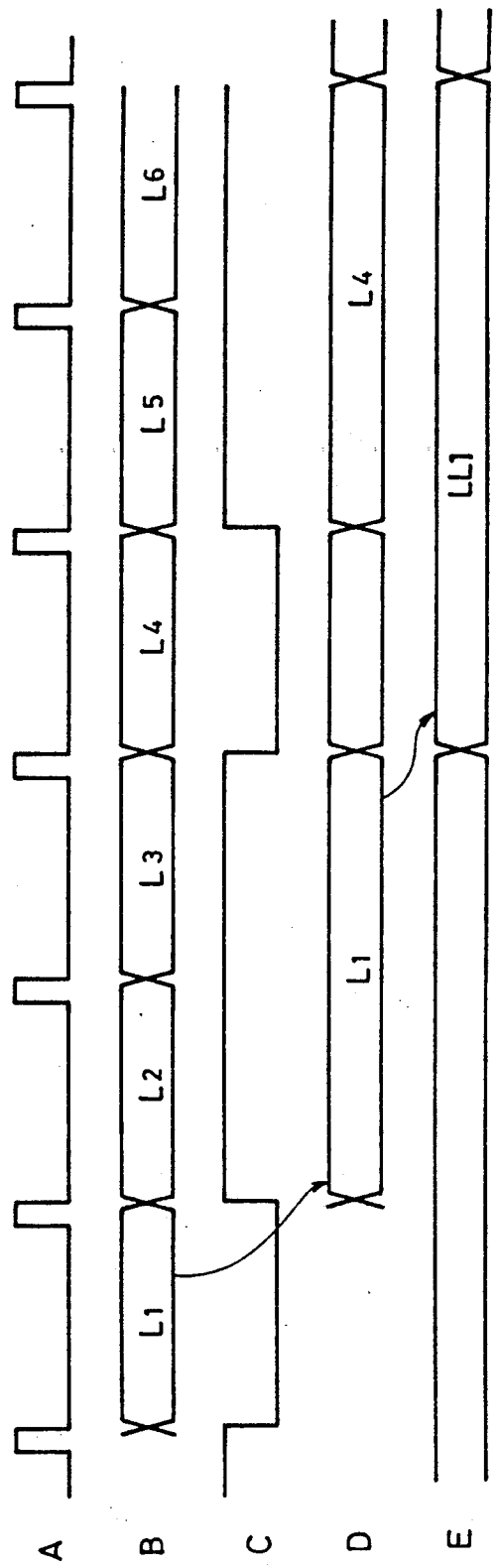

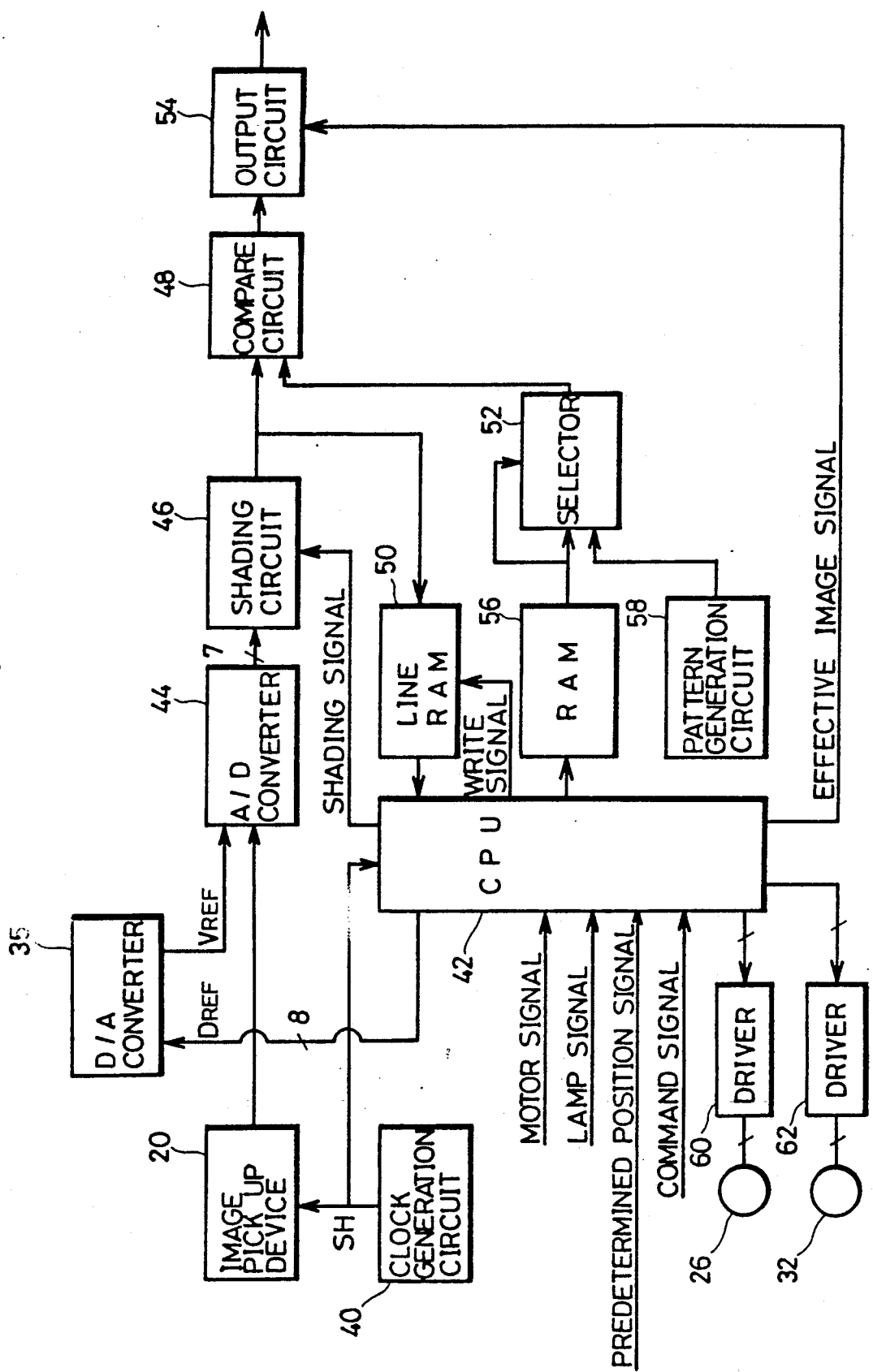

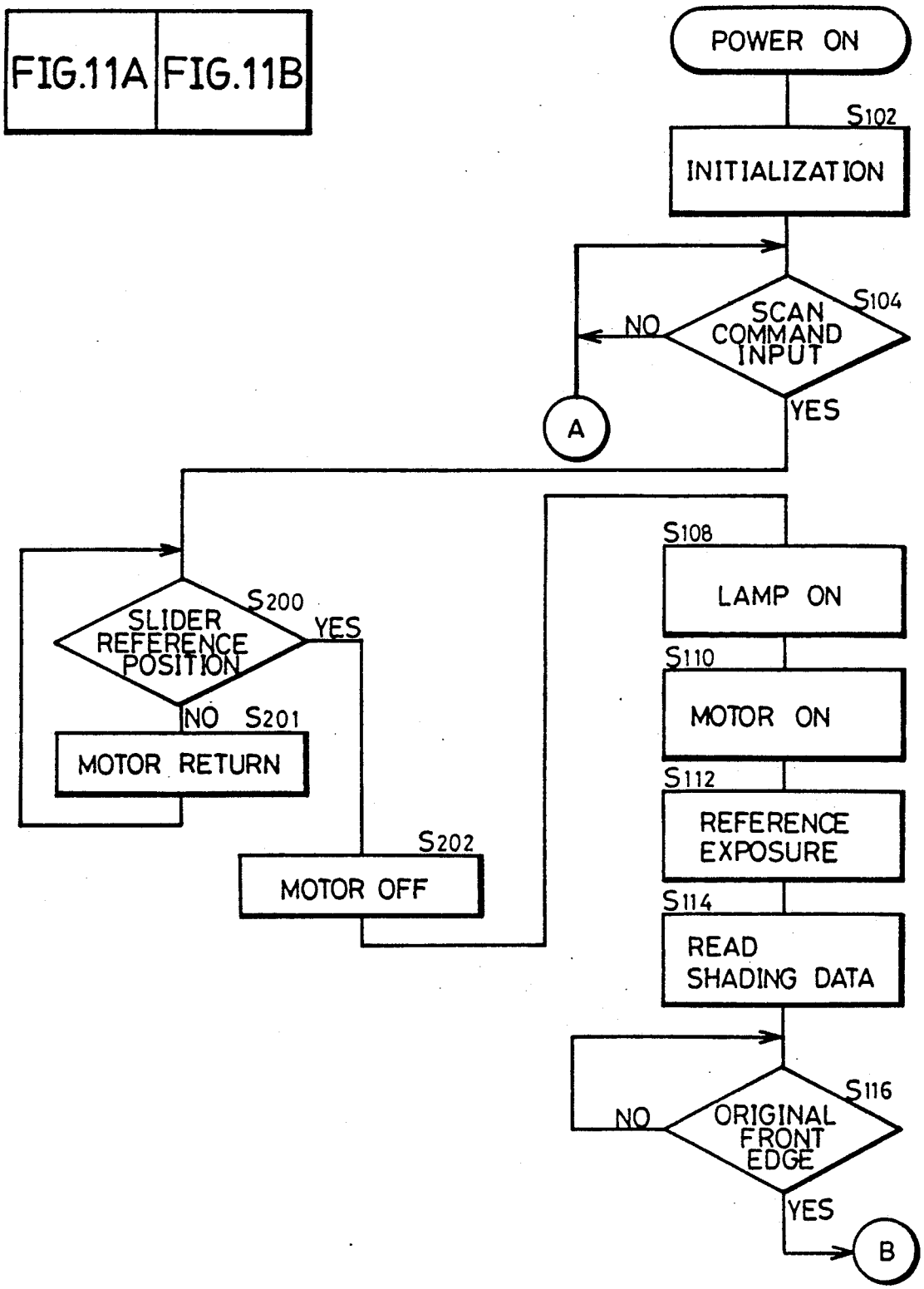

IMAGE READER

BACKGROUND OF THE INVENTION

1. Field of the Invention

The present invention relates generally to an image reader and more particularly to an image reader capable of adjusting the image density without prescanning or special sensors to detect the density of an original.

2. Description of Related Art

An image reader is used, for example, when an image of an original is electronically filed and read to be transmitted by facsimile, and the like. Conventionally, image readers using the linear charge coupled device (hereinafter abbreviated as CCD) have been provided.

Such an image reader has a platen glass to place the original and the CCD to scan the original. Reflection light from the original is converted, into an electric signal by the CCD. The electric signals are outputted as image data successively after being processed by a prescribed signal processing circuit.

When an image is read by the image reader, the density of the image to be formed is adjusted at an appropriate level. In order to effect this adjustment, conventionally the density of the original image has been previously read by prescanning, which is performed before the scanning for an actual image reading. The read signals are adjusted so that the density becomes near the reference level. Other than the above described method for adjustment, sensors for detecting the density of the original image are used. The sensors carry out the density detection of the image. The image signals are adjusted based on the obtained density.

As described above, in the conventional image readers, prescanning or special apparatuses such as sensors for detecting density must be provided for adjusting the density of the image. Consequently, it takes much time for density adjustment and the image reader becomes expensive.

SUMMARY OF THE INVENTION

Therefore, an object of the present invention is to provide an image reader in which the adjustment of the image density can be carried out easily and properly.

Another object of the present invention is to provide an image reader which is capable of reducing time and cost.

A further object of the present invention is to provide an image reader which does not require prescanning for adjusting the density of an image.

A still further object of the present invention is to provide an image reader which does not require a density detecting sensor for adjusting the density of an image.

These objects of the present invention can be accomplished by an image reader comprising: a platen for mounting an original having a background portion and a character portion; scanning means for scanning an original placed on the platen, including exposure lamp for illuminating the original, a line image sensor with a light receiving means for receiving reflected light of the exposure lamp reflected from the surface of the original, for outputting analog image data dependent on the amount of light received by the light receiving means, and a projection lens for projecting the image of the original on the line image sensor; analog-to-digital converting means for converting analog image data into digital multilevel image data; memory means for storing the digital multilevel image data; image density level extracting means for extracting the density level based on the digital multilevel image data; arithmetic means for comparing the image density level extracted by the image density level extracting means with a predetermined reference density level to find the difference; means for adjusting the amount of light for adjusting the amount of light of the exposure lamp in order to make the difference obtained from the arithmetic means equal to 0; binary converting means for converting the digital multilevel image data into binary image data; and parallel processing control means for effecting in parallel the adjustment of light amount by the means for adjusting the amount of light and the conversion of data by the binary converting means.

In the foregoing, the image density level of the background region means the level based on the data obtained from the reflected light from the background region of the original image, for example.

The reference density level means, for example, the level based on the data obtained from the reflected light from an ideal white original. When an output signal from the CCD is quantized in 7 bits and the black level is "0" and the white level is "127", then the reference density level becomes 127.

Therefore, the comparison of the density level of the image in the background region with the reference density level and the elimination of the difference means the following process. For example, when the background region of the original is pale blue and the density data of the region is "100", then the above mentioned image level is made near "127", whereby the background region of the image to be formed becomes white. The above described operation of making the level of the background region near the reference level is effected by controlling the amount of light of the exposure lamp.

The above described objects of the present invention can be also accomplished by an image reader comprising: a platen for mounting an original having a background portion and a character portion; scanning means for scanning the original mounted on the platen, including an exposure lamp for illuminating the original, line image sensor with light receiving means for receiving the reflected light of the exposure lamp reflected from the surface of the original for outputting analog image data dependent on the amount of light received by the light receiving means, and a projection lens for projecting the original image on the line image sensor; analog-to-digital converting means for converting analog image data to digital multilevel image data based on the reference voltage; memory means for storing the digital multilevel image data; image density level extracting means for extracting the image density level corresponding to the background portion of the original based on the digital multilevel image data; arithmetic means for comparing the image density level extracted by the image density level extracting means with a predetermined reference density level to find a difference; reference voltage adjusting means for adjusting the reference voltage of the analog-to-digital converting means based on the difference obtained from the arithmetic means; binary converting means for converting the digital multilevel image data into binary image data; and parallel processing control means for effecting in parallel the reference voltage adjustment by said reference voltage adjusting means and the conversion of data by the binary converting means.

The meanings of the image density level of the background region and the like are the same as that described in the foregoing. In the image reader having such structure, the level of the background region is made similar to the reference level by controlling the reference voltage of the analog-to-digital converting means.

The detection of the density level of the background region and the adjustment of the amount of light are successively carried out in parallel to the reading of the image. Therefore, the image sensor in accordance with the present invention requires neither prescanning nor special sensor apparatus for density adjustment. Consequently, an image reader can be provided in which the adjustment of image density can be easily and properly carried out.

These objects and other objects, features, aspects and advantages of the present invention will become more apparent fromt the following detailed description of the present invention when taken in conjunction with the accompanying drawings.

BRIEF DESCRIPTION OF THE DRAWINGS

FIG. 5 is a block diagram of a circuit for generating image data in accordance with a first embodiment of the present invention;

FIG. 6A-B is a flow chart showing the control of the control CPU of the image reader in accordance with the first embodiment of the present invention;

FIG. 7 is a time chart showing the control of the control CPU of the image reader in accordance with the first embodiment of the present invention;

FIG. 10 is a block diagram of a circuit for generating image data in accordance with the second embodiment of the present invention;

FIG. 11A-B is a flow chart showing the control of the control CPU of the image reader in accordance with the second embodiment of the present invention.

DESCRIPTION OF THE PREFERRED EMBODIMENTS

The embodiments of the present invention will be described in the following order with reference to the appended drawings.

Figure 1:
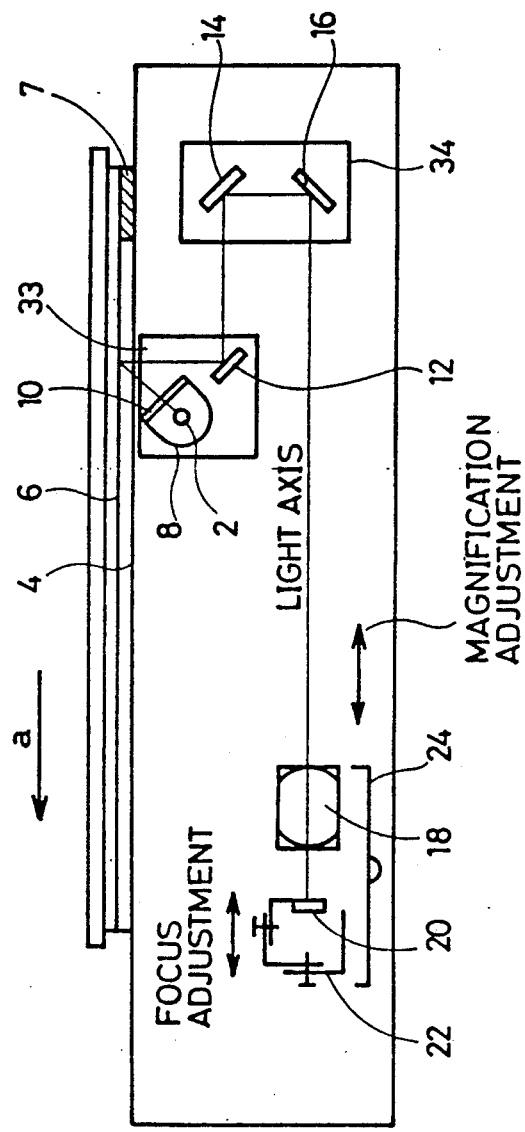
FIG. 1 is a schematic cross sectional view showing the structure of an image reader in accordance with the present invention.

(1) An outline of the structure of the image reader
(2) Description of the test pattern
(3) Control means of the image reader in accordance with a first embodiment (4) Description of the operation of the image reader in accordance with the first embodiment
(5) Control means of the image reader in accordance with a second embodiment
(6) Description of the operation of the image reader in accordance with the second embodiment (1) Outline of the Structure of the Image Reader FIG. 1 is a schematic cross sectional view showing the structure of the image reader in accordance with the present invention.

The image reader in accordance with the present invention comprises an original glass plate 4 for mounting an original 6, a lens 18 and a CCD line sensor 20 (hereinafter referred to as a line sensor) for reading the image of the original 6 and a first slider 33 and a second slider 34 including an optical system for transmitting the image on the original 6 to the line sensor 20. The line sensor 20 comprises a plurality of image pick up devices arranged in a line. The first slider 31 comprises a halogen lamp 2 which is an exposure source, a reflection mirror 8 and an infrared filter 10 which are attached to the halogen lamp 2, and a first mirror 12. The second slider 32 comprises a second mirror 14 and a third mirror 16. The line sensor 20 is protected by a line sensor holding portion 22 and, together with the lens 18, is attached to the carriage 24. The line sensor protecting portion adjusts the position and angle of the line sensor. A test pattern (see FIG. 3) for adjusting magnification and focus, and for correcting shading is provided at the end and on the lower surface of the original glass plate 4.

The operation will be described in the following. The halogen lamp 2 which is the exposure source irradiates the original 6 placed on the original glass plate 4. The original 6 is placed along and juxtaposed to the original scale provided on the original glass plate 4. In reading the original image, the first slider 31 and the second slider 32 are moved in the direction of the arrow a in the figure. The second slider 32 moves at the half speed of the first slider. The light reflected from the original 6 are successively reflected by the first mirror 12, the second mirror 14 and the third mirror 16 and, thereafter, it enters the line sensor 20 through the lens 18. As the original image 6 is being scanned, the reflected light from the original 6 successively enters the line sensor 20 for every line.

Figure 2:
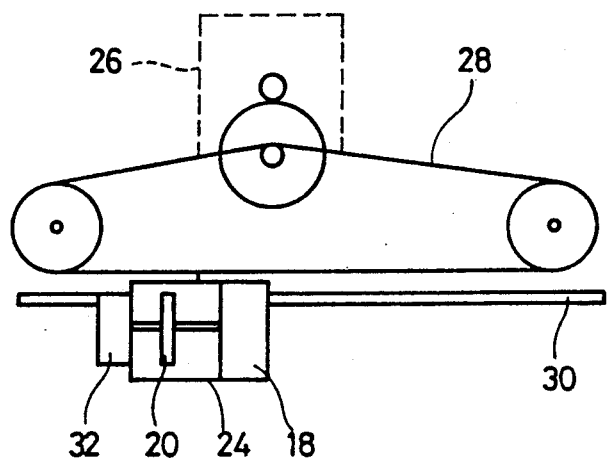
FIG. 2 is a plan view illustrating the moving mechanism of a lens and a line sensor.

FIG. 2 is a plan view for illustrating the moving mechanism of the carriage 24. The carriage 24 is moved by a lens motor 26 through the wire 28 along a guide rail 30. The magnification is adjusted by moving the carriage 24 in the direction of the light axis. The focus adjustment is carried out by moving the line sensor holding portion 22 in the direction of the light axis by a focusing motor 32.

(2) Description of the Test Patter

Figure 3:
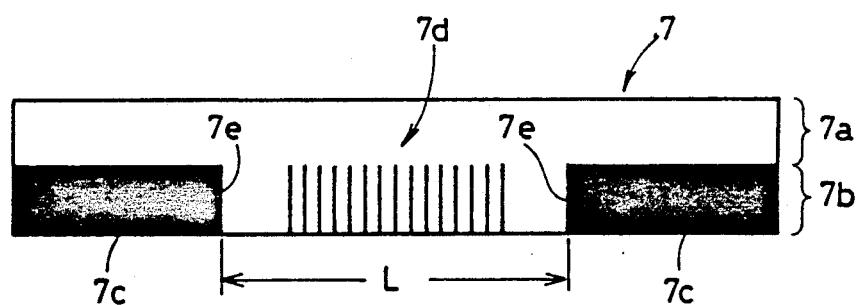
FIG. 3 is a plan view of a test pattern.

The test pattern 7 for adjusting magnification and focus, and for correcting shading and the like comprises a white shading portion 7a in the upper half and a pattern portion 7b in the lower half as shown in FIG. 3.

The shading correction is carried out in the following manner. First, the reflected light from the test pattern 7 which is uniform white is subjected to the photoelectric conversion by the image pick up device 20. Thereafter, the converted electric signal are read and taken in the A/D converter and the shading circuit. The details about the A/D converter and the shading circuit will be described later. The difference between the read electric signal and the ideal signal is corrected. The above mentioned difference is caused by unevenness of the optical system such as the lamp 2 or by the influence of variation in the characteristics in the image pick up devices constituting the line sensor 20. The data for correction is stored in the shading circuit.

Figure 4:
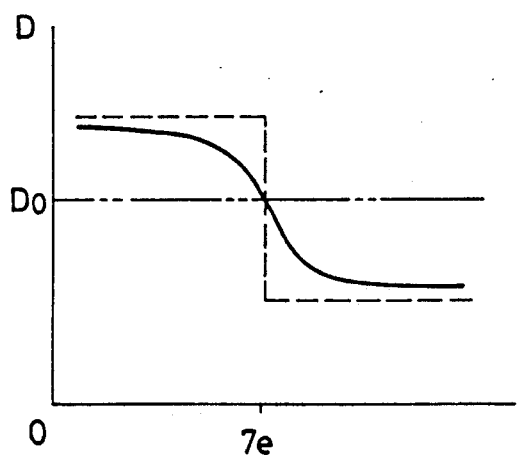
FIG. 4 is a graph showing a density distribution of a black pattern portion employed in focus adjustment of the line sensor.

The pattern portion 7b of the test pattern 7 comprises black patterns 7c, 7c provided on both sides and a stripe pattern 7d provided in the central portion. The magnification is determined in the following manner. The distance L between black patterns 7c and 7c is measured by the line sensor 20. The distance L is compared with a prescribed length to be evaluated. The focus adjustment is effected in the following manner. The distribution data of the density D near the inner edge 7e of the black pattern portion 7c is measured (solid line in FIG. 4). The CCD 20 is moved by the focusing motor 32 so that the above mentioned density data comes near the state shown by the dotted line in FIG. 4.

As described above, the focus and magnification are adjusted by the apparatus of this embodiment.

As shown in FIG. 1, the test pattern is placed at the edge portion of the original glass plate 4. Therefore, in the apparatus of this embodiment, the image data having the optimal density is obtained simultaneously with the reading of the image. Therefore, neither prescanning nor special sensors are required for adjusting the density.

(3) Control Means of the Image Reader in Accordance with the First Embodiment

FIG. 5 is a black diagram of a circuit for generating the image data in accordance with the first embodiment of the present invention.

The clock generation circuit 40 applies the necessary shift pulse signal SH to the line sensor 20 and, simultaneously, it applies a clock signal to the CPU 42. The line sensor 20 receives the reflected light from the original and converts the reflected light into the electric signal corresponding to the amount of received light. The A/D converter 44 converts analog signals from the line sensor 20 to digital multilevel signals.

The shading circuit 46 is to correct unevenness of the amount of light in the main scanning direction (line direction) or the variation of the elements (pixels) of the line sensor 20. The shading circuit 46 has the timing for correction provided by the shading signal from the CPU 42. The output signals from the shading circuit 46 are inputted to a compare circuit 48 for binarization and a line RAM 50.

The compare circuit 48 carries out the comparison of magnitude between the shading corrected image signal and the reference signal (reference signal for binarization) selected in a selector 52. The result is outputted by 1 bit to an output circuit 54. The output circuit 54 externally outputs 1 bit image signal and an effective image signal.

The effective image signal is the signal outputted in association only with the effective portion of the original, which is used when a portion of the original is trimmed or masked.

The line RAM 50 stores the shading corrected image signals for one line. The writing signal is outputted from the CPU 42. The CPU 42 obtains image information of one line from the line RAM 50.

On the attribute information and uniform threshold information for binarization (binarization without employing dither method) are stored in the RAM 56. The attribute information comprises information for each pixel, e.g. whether the pixel should be subjected to the binary processing or intermediate processing. The attribute information is inputted beforehand by the operator through an operating panel and the like, not shown. The binary or dither attribute is determined by the CPU 42 based on the image information of one line written in the line RAM. The above mentioned uniform threshold value is also determined based on the above mentioned image information of one line. The pattern generation circuit 58 generates the information of the threshold value in accordance with the dither method (uneven threshold value). The said threshold value is generated in the matrix form of m $\times$ n).

The selector 52 selects the threshold information for binarization which is to be transmitted to the compare circuit 48 based on the attribute information from the RAM 56. More specifically, when the attribute is dither, it transmits the dither pattern data from the pattern generation circuit 58 as the threshold information and, if the attribute is binary, it transmits the uniform level data from the RAM 56 as the threshold information to the compare circuit 48.

The light adjusting circuit 41 is controlled by the light amount signal from the CPU 42 to adjust the intensity of emitted light from the exposure lamp 2. The control is the feedback control based on the image information of one line written in the line RAM 50. It is carried out in such a manner that the image data corresponding to the background of the original (not always white) become white level, for example.

The CPU 42 inputs a motor signal, lamp signal, predetermined position signal and a command signal. The magnification and focus are adjusted by driving the lens motor 26 and the focusing motor 32, respectively, through drivers 60 and 62.

(4) Description of the Operation of the Image Reader in Accordance with the First Embodiment The operation of the image reader in accordance with the first embodiment will be described in the following.

Figure 6B:
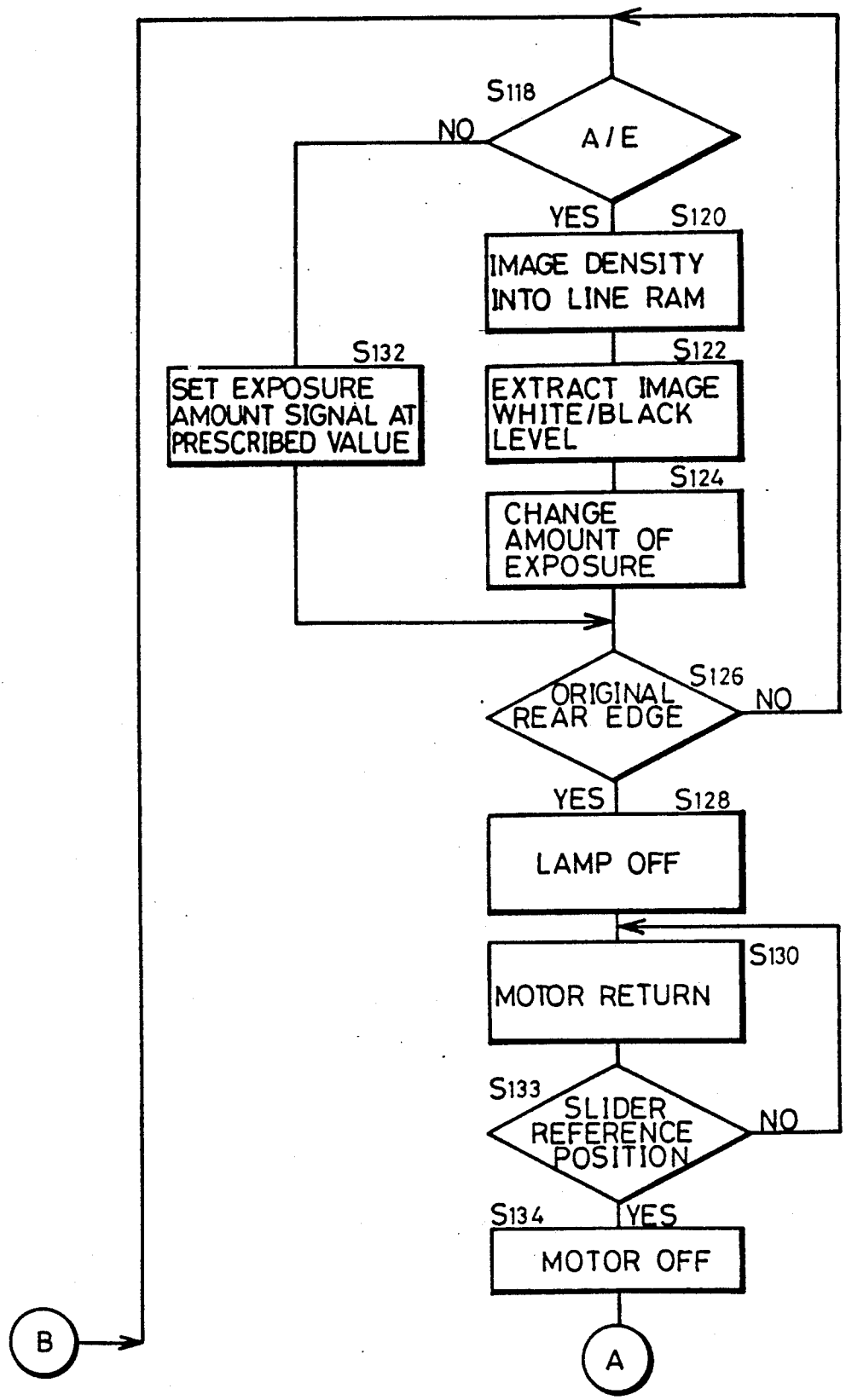

FIG. 6 is a flow chart showing the control of the image reader by the control CPU 42 and FIG. 7 is a time chart. Meanwhile, processes such as magnification adjustment, focus adjustment, output of image data and so on which have no direct relation with the main portion of the present invention are omitted in the flow chart.

The CPU 42 starts its operation when the power is turned on, for example, and initialization is effected (S102).

When the scan command is inputted (S104), the position of the slider is checked. When the slider is not in the reference position (S200), a driving signal to the slider driving motor, not shown, is generated (S201). The slider (the slider comprises a first slider mounting a halogen lamp 2 and the like and a second slider mounting a mirror 14 and the like) is set at the reference position. Thereafter, the said driving signal is turned off (S202). Whether the slider is at the reference position or not is determined by, for example, input of a predetermined position signal from the scanning system. Thereafter, an on signal to the exposure lamp 2 and to the slider driving motor is generated (S108, S110), so as to start the exposure scanning of the test pattern and the original.

The intensity of emitted light of the exposure lamp 2 is set at the optimal level based on the reflected light from the white pattern portion 7a of the test pattern 7 (Sll2). The setting is effected in the following manner. When the analog image signal from the line sensor 20 is quantized by 7 bit, for example, [128 stages from the black level 0 to white level 127), the intensity of emitted light from the lamp 2 is adjusted such that the maximum value of the digital image signal obtained from the reflected light from the white pattern portion 7a becomes 127.

Based on the reflected light from the white pattern portion 7a of the test pattern 7, the data for shading correction is written in the RAM of the shading circuit 46 (Sll4). The said data for correction is to multiply the output data from each pixel in the line sensor 20 by a prescribed coefficient for each pixel. Consequently, the data obtained from the white pattern portion 7a is made uniform by the shading correction.

When the scanning position reaches the edge of the image (Sll6), the effective image signal is generated and the output of the image data begins at the output circuit 54. The effective image region from which the effective image signals are generated is designated previously by the operator by an operating panel, not shown.

When automatic exposure adjustment mode is selected (Sll8: Yes), the image data B is written in the line RAM 50 through the shading circuit 46 in synchronization with the line RAM writing signal C (S120). The RAM writing signal C rises at every three clocks of SH signal A (see FIG. 7).

Referring to FIG. 7, A is a shift pulse signal for outputting image signals from the line sensor. B denotes the image data read at each time. L1, L2, L3 and so on correspond to the first, second, third line, and so on, respectively. C is a line RAM writing signal, and when it rises, the data read immediately before the rising is written in the line RAM 50. D shows the contents of the data held in the line RAM 50. In the period labeled by L1, the data read by the first line (L1) is held in the line RAM 50. E denotes an exposure amount signal. In the period labeled by LL1, the image portion is read by the amount of light based on the data read by the first line (L1).

FIG. 7 shows the following operation. Namely, the image data L1 is stored in the line RAM 50. The difference from the reference density level is evaluated based on the data. The amount of light of the halogen lamp is controlled such that the difference obtained from the operation becomes 0. The fourth to sixth lines are read by the line sensor 20 by that amount of light.

Based on the said written line RAM data D, the image data corresponding to the background portion and the image portion of the original is extracted.

There are various methods for extraction. For example, a histogram is formed of the data of each of the pixels of the line RAM data D and the level which is most frequent above the level 63 may be extracted a the density level of the background portion and the level which is most frequent below the level 63 may be extracted as the density level of the image portion.

Figure 8A:
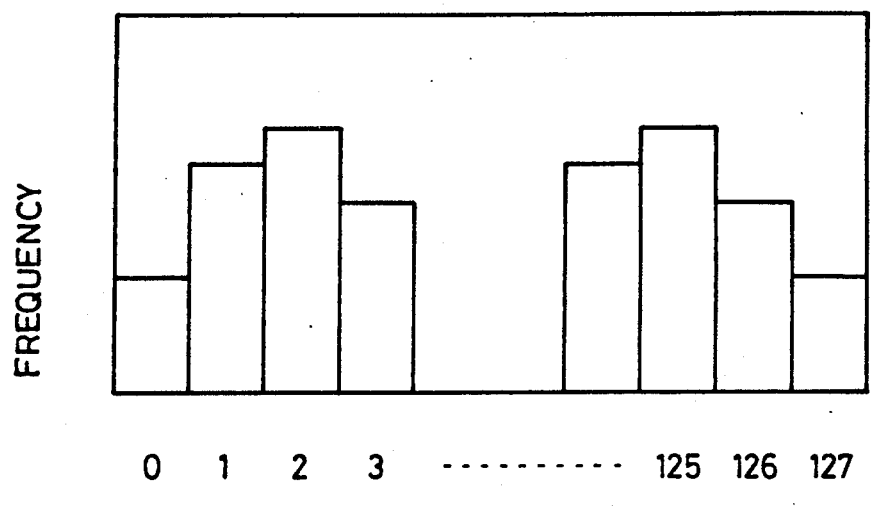
FIGS. 8A and 8B are graphs illustrating the method for extracting the image density level.
Figure 8B:
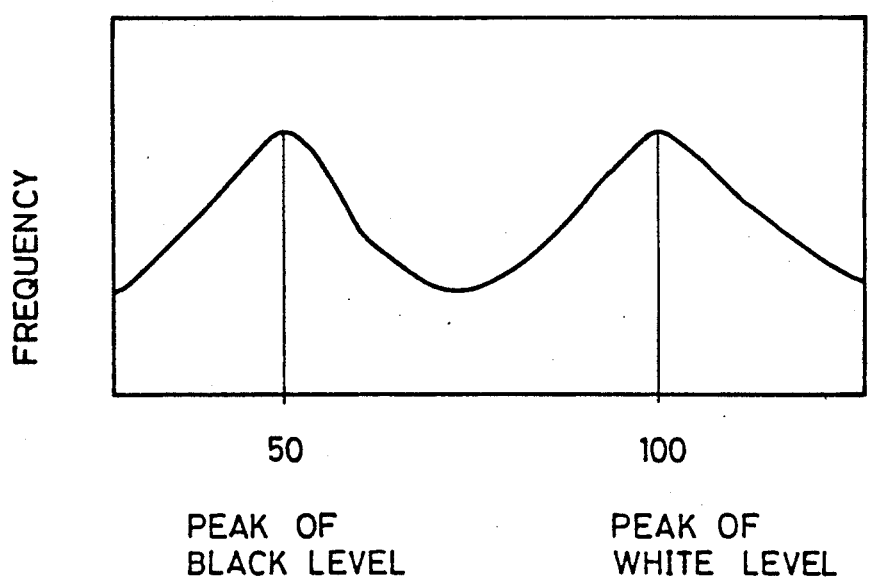

The method is shown in FIGS. 8A and 8B. FIG. 8A shows the relation between the frequency and the level in which the data of each of the pixels in the line RAM data D is allocated in accordance with the level and FIG. 8B is the graph obtained by linking the vertices of the histogram of FIG. 8A to show the peak value of the level more clearly. Referring to FIG. 8B, there are two peaks in the graph. One is the peak corresponding to the image portion and the other is the peak corresponding to the background portion. According to the present invention, the peak value corresponding to the background portion is the data extracted.

The region of the original to which trimming and the like is carried out may be designated by the operator o automatically. When trimming operation should be effected, the density levels of the image portion and the background portion are based on the image data in the trimming region.

The exposure amount signal E is controlled based on the said extracted density data (S124). Namely, the intensity of the emitted light from the exposure lamp 2 is adjusted. The adjustment is effected in such a manner that the data corresponding to the background portion after the shading correction becomes the maximum value 127 (see Sll2).

As is apparent from the time chart of FIG. 7, the image data of one line is stored in the line RAM 50 at every three lines. The correction of the amount of light in reading the following three lines is carried out based on the data. Therefore, the time of starting adjustment by the exposure amount signal E is delayed from the referred image data B by three clocks of the SH signal A, that is, by three lines of the scanning.

If the automatic exposure adjustment mode is not selected in the said step Sll8, the exposure amount signal E is set at a prescribed value (S132). The prescribed value is selected in such manner as follows. The exposure intensity is evaluated which makes the image density level corresponding to the white pattern portion 7a of the test pattern 7 becomes the said maximum value 127. The value of the exposure amount signal to obtain the exposure intensity is the above mentioned prescribed value.

When the exposure scanning position reaches the rear end of the original (S126), the effective image signal is turned off to stop the data output from the output circuit 4. The off signal of the exposure lamp 2 is generated (S128). A return signal for the slider driving motor is generated (S130) so that the slider is returned to the reference position. After it is determined that the slider is returned at the reference position (S133), the off signal of the slider driving motor is generated (S134).

Figure 9:
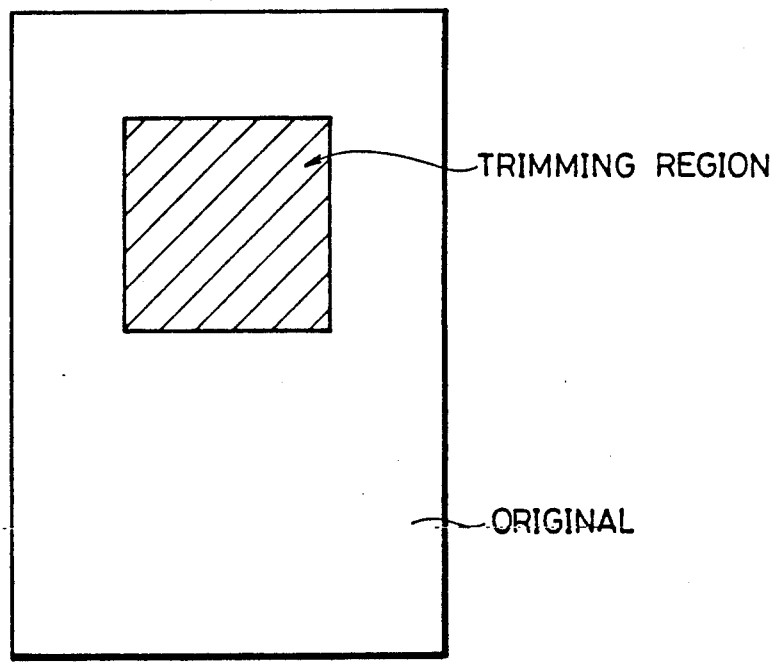
FIG. 9 shows the control region in the trimming mode in accordance with a second embodiment of the present invention.

Meanwhile, if the edition image forming such as trimming is designated, the above described control is carried out only for the trimming region out of the original region as shown in FIG. 9.

In the above embodiment, the data is extracted at every three lines as shown in FIG. 7. The following three lines are automatically exposed using the image data obtained based on the extracted data.

Alternatively, the following method may be employed. Namely, the data for plural lines are successively extracted. The maximum value or the average value of the obtained data is evaluated. The image data is formed based on the result of operation. The following plurality of lines are automatically exposed based on the obtained image data.

More specifically, let us assume that,
the image level of the nth line = 110
the image level of the n+1th line = 111
the image level of the n+2th line = 112
the image level of the n+3th line = 111.

In this case, the following four lines are automatically exposed using the average level 111 of each of the lines.

(5) Control Means of the Image Reader in Accordance with a Second Embodiment

The second embodiment of the present invention will be described in the following. In the second embodiment, the level of the background region is made near the reference level by controlling a reference voltage of the A/D conversion. The second embodiment is the same as the first embodiment except the above mentioned point. Therefore, only the portions different from the first embodiment are described.

FIG. 10 is a block diagram of a circuit for generating the image data in accordance with the second embodiment of the present invention.

Referring to FIG. 10, the point different from the first embodiment is that the lamp 2 provided with light adjusting circuit 41 is eliminated and a D/A converter 35 is provided to apply the reference voltage to the A/D converter 44.

The D/A converter 35 is controlled by a 8 bit reference voltage signal Dref from the CPU 42 to adjust the reference voltage of the A/D converter 44. The control is the feedback control carried out based on the image information of one line written in the line RAM 50. The control is carried out such that the image data corresponding to the background of the original (not always white) has the white level.

Since other portions are the same as the first embodiment, the description thereof will be omitted.

Figure 11B:
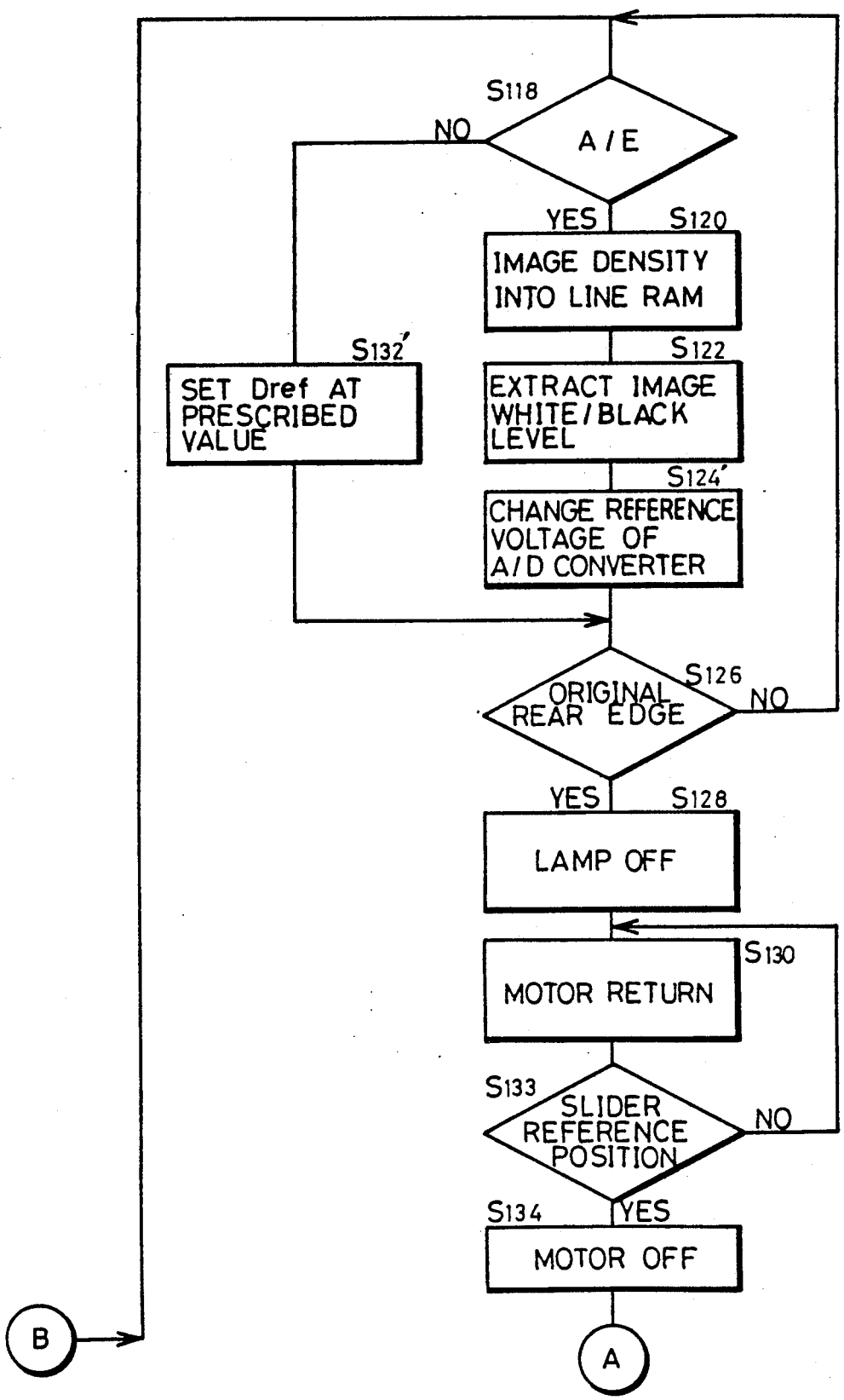
Figure 12:
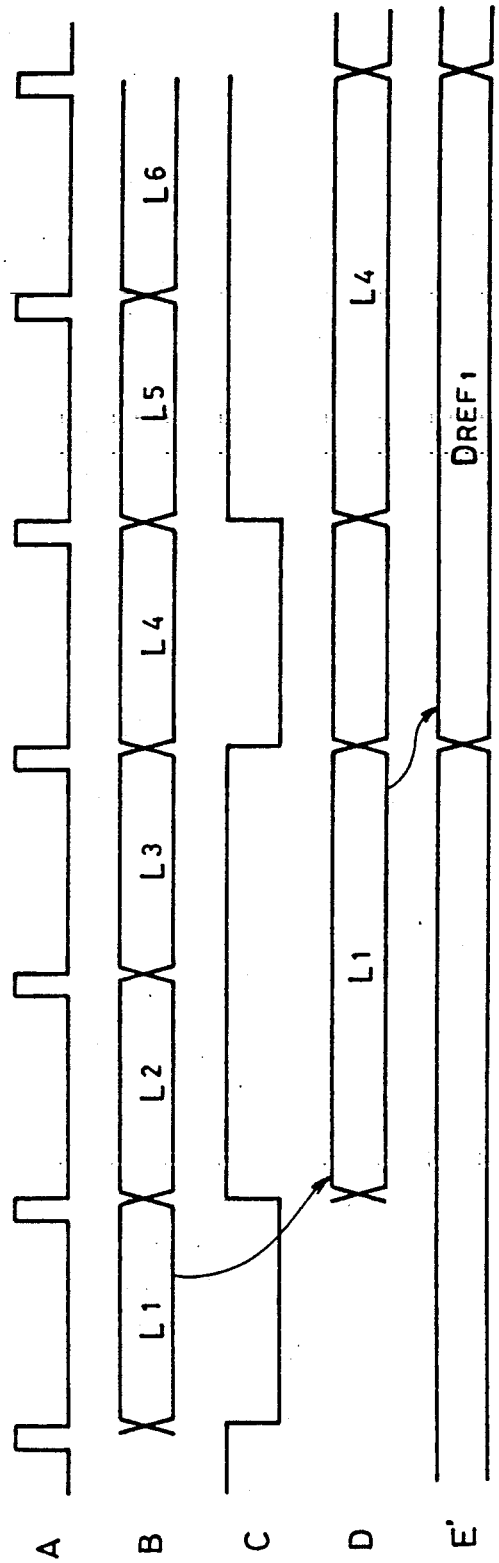
FIG. 12 is a time chart showing the control of the control CPU of the image reader in accordance with the second embodiment of the present invention.

(6) Description of the Operation of the Image Reader in Accordance with the Second Embodiment FIG. 11 is a flow chart showing the content of the control of the image reader by the control CPU 42 in accordance with the second embodiment and FIG. 12 is a time chart.

The steps before the extraction of the density data of the original region or the density data of the trimming region (steps before S122) are the same as the first embodiment, so that the description thereof will be omitted.

Referring to FIG. 11, the steps following the step S122 will be described.

The reference voltage signal Dref is controlled based on the density data extracted in the step S122 (S124). The reference voltage of the A/D converter is adjusted. The adjustment is carried out such that the data corresponding to the background portion after the shading correction becomes the maximum value of 127 (see S112).

As is apparent from the E' of the time chart of FIG. 12, the time for starting adjustment by the reference voltage signal Dref delays from the image data B to be referred to by three clocks of the SH signal A, that is, three lines of the scanning.

If the automatic exposure adjustment mode is not selected in the said step S118, the reference voltage signal Dref is set at a prescribed value (S132'). The prescribed value is selected in the following manner. Namely, the reference voltage is evaluated which makes the image density level corresponding to the white pattern portion 7a of the test pattern 7 to be the said maximum value 127. The reference voltage value is the prescribed value.

When the exposure scanning position reaches the rear end of the original (S126), the effective image signal is turned off. The output of data from the output circuit 54 is stopped. The off signal of the exposure lamp 2 is generated (S128). A return signal for the slider driving motor is generated (S130). The slider is returned to the reference position (S133). The off signal of the slider driving motor is generated (S134).

As described in detail in the foregoing, in the present invention, the data for adjusting density is read by one line unit in the image reader employing a linear sensor and the intensity of emitted light from the exposure lamp is successively controlled based on the data, or the reference voltage of the A/D conversion is controlled.

As is apparent from the description of the embodiments, according to the present invention, the density adjustment can be carried out during the reading of the image. Therefore, an image reader is provided which requires neither prescanning nor special sensors for density detection.

Although the present invention has been described and illustrated in detail, it is clearly understood that the same is by way of illustration and example only and is not to be taken by way of limitation, the scope of the present invention being limited only by the terms of the appended claims.

What is claimed is:

1. An image reader comprising:
    a platen for mounting an original having a background portion and a character portion;
    scanning means for scanning said original mounted on said platen, including an exposure lamp for illuminating said original, a line image sensor with light receiving means for receiving reflected light from said exposure lamp reflected at the surface of said original for outputting analog image data corresponding to the amount of light received by said light receiving means, and a projection lens for projecting an image of said original on said line image sensor;
    analog-to-digital converting means for converting said analog image data into digital multilevel image data;
    memory means for storing said digital multilevel image data;
    image density level extracting means for extracting the image density level corresponding to the background portion of said original based on said digital multilevel image data;
    arithmetic means for comparing the image density level extracted by said image density level extracting means with a predetermined reference density level to find a difference;
    light amount adjusting means for adjusting the amount of light from said exposure lamp based on the difference obtained by said arithmetic means;
    binary converting means for converting said digital multilevel image data into binary image data; and
    parallel processing control means for carrying out said light amount adjustment by said light amount adjusting means and the conversion of data by said binary converting means in parallel.

2. An image reader according to claim 1, wherein said light amount adjustment comprises the adjustment of light amount to make the difference which is obtained by said arithmetic means equal to 0.

3. An image reader according to claim 1, wherein said digital multilevel image data which is to be converted by said binary converting means comprises the digital multilevel image data subjected to said light amount adjustment.

4. An image reader according to claim 1, wherein said memory means comprises the memory capacitance of at least one line of said line image sensor.

5. An image reader according to claim 3, wherein said memory means stores digital multilevel image data for ever prescribed line.

6. An image reader comprising:
a platen for mounting an original having a background portion and a character portion;
scanning means for scanning said original mounted on said platen, including an exposure lamp for illuminating said original, a line image sensor with light receiving means for receiving reflected light of said exposure lamp reflected from a surface of said original for outputting analog image data corresponding to the amount of light received by said light receiving means, and a projection lens for projecting an image of said original on said line image sensor;
analog-to-digital converting means for converting said analog image data to digital multilevel image data based on a reference voltage;
memory means for storing said digital multilevel image data;
image density level extracting means for extracting the image density level corresponding to the background portion of said original based on said digital multilevel image data;
arithmetic means for comparing the image density level extracted by said image density level extracting means with a predetermined reference density level to find a difference;
reference voltage adjusting means for adjusting the reference voltage of said analog-to-digital converting means based on the difference obtained by said arithmetic means;
binary converting means for converting said digital multilevel image data to binary image data; and
parallel processing control means for carrying out said reference voltage adjustment by said reference voltage adjusting means and the conversion of data by said binary converting means in parallel.

7. An image reader according to claim 6, wherein said reference voltage adjustment comprises adjustment of the reference voltage to make the difference which is obtained by said arithmetic means equal to 0.

8. An image reader according to claim 6, wherein said digital multilevel image data which is to be converted by said binary converting means comprises digital multilevel image data subjected to said reference voltage adjustment.

9. An image reader according to claim 8, wherein said memory means comprises the memory capacitance of at least one line of said line image sensor.

10. An image reader according to claim 9, wherein said memory means stores digital multilevel image data at every prescribed line.

* * * * *